United States Patent [19]

Koch et al.

[11] 4,434,832
[45] Mar. 6, 1984

[54] ROOM TEMPERATURE CURABLE TIRE PATCH

[75] Inventors: Russell W. Koch, Hartville; William W. Barbin, Massillon, both of Ohio

[73] Assignee: The Firestone Tire & Rubber Company, Akron, Ohio

[21] Appl. No.: 477,452

[22] Filed: Mar. 21, 1983

[51] Int. Cl.³ .......................................... B60C 21/00
[52] U.S. Cl. .................................. 152/370; 152/367; 152/371; 156/95; 156/97; 264/36; 427/140; 428/63
[58] Field of Search ............... 156/97, 95, 307.3, 315; 427/140; 152/367, 371, 370; 428/63; 264/36

[56] References Cited

U.S. PATENT DOCUMENTS

| | | | |
|---|---|---|---|
| 3,644,256 | 2/1972 | Broisman | 269/29 |
| 3,718,587 | 2/1973 | Bhakuni | 252/8.6 |
| 3,755,261 | 8/1973 | VanGulick | 260/77.5 |
| 3,779,794 | 12/1973 | DeSantis | 117/72 |
| 3,834,934 | 9/1974 | Broisman | 117/76 T |
| 3,888,831 | 6/1975 | Kogon | 260/77.5 |
| 3,966,530 | 6/1976 | Cutts et al. | 156/308 |
| 3,991,255 | 11/1976 | Blaskiewicz et al. | 428/425 |
| 4,085,283 | 4/1978 | Den Otter et al. | 260/248 |
| 4,125,522 | 11/1978 | Becker | 528/61 |
| 4,136,219 | 1/1979 | Odam et al. | 427/385 B |
| 4,143,454 | 3/1979 | Utsunomiya | 29/460 |
| 4,158,378 | 6/1979 | Pearson et al. | 152/353 R |
| 4,240,852 | 12/1980 | Gomberg | 156/96 |
| 4,300,970 | 11/1981 | Honda et al. | 156/244.11 |
| 4,311,181 | 1/1982 | Hausch | 152/353 R |
| 4,327,138 | 4/1982 | Hausch | 428/36 |
| 4,352,704 | 10/1982 | Williams | 156/125 |

FOREIGN PATENT DOCUMENTS 1352645 5/1971 United Kingdom .

OTHER PUBLICATIONS

"Room Temperature Vulcanizing Adhesive Based on Ethylene-Propylene-Diene Terpolymer," Cantor, Uniroyal, Paper No. 18, 10/10/73, Hughson Chemical Division, Lord Corporation, Products TS-2682-71.

Primary Examiner—George F. Lesmes
Assistant Examiner—P. R. Schwartz
Attorney, Agent, or Firm—Daniel N. Hall

[57] ABSTRACT

The repair of a reinforced elastomer article having a hollow therein relates to utilizing an amine curable polymer or prepolymer and a cured elastomer patch. The hollow in the elastomer, which can extend either partially or completely through the article, is filled with a gum rubber which is thereafter cured by conventional means, such as with spotters. The area beneath the now filled hollow is coated with a treating agent, followed by the amine curable polymer or prepolymer and a cured patch. The polymer is then cured at room temperature. One area of use is in the repair of tires.

19 Claims, 2 Drawing Figures

ROOM TEMPERATURE CURABLE TIRE PATCH

TECHNICAL FIELD

The present invention relates to a composition and method for repairing reinforced elastomer articles having a hollow therein, such as for example a puncture in a tire. More specifically, the present invention relates to the utilization of a patch in association with the elastomer article and an amine curable polymer or prepolymer which is curable at ambient temperatures and which acts as an adhesive agent.

BACKGROUND ART

Heretofore, reinforced rubber articles such as tires having a cut or opening therein have been repaired with a patch. Generally the opening is first filled with an uncured gum rubber which is thereafter cured by such means as portable heating units or spotters. If required, a patch is applied to the inner surface of the tire or other article. Usually such a patch is needed if the reinforcing materials in the article, primarily cords or belts have been partially or completely severed, providing a weakened area prone to subsequent failure. In providing a patch reinforced to the same degree as the amount of lost reinforcement, the repaired article is, at least in theory, as strong as before the injury.

Prior art patches fall into two classes, the chemical cure patches which are high in cost and provide only poor adhesion to the substrate and uncured patches which require the use of heat for proper cure and adhesion. Unlike the method of heat application for the gum rubber filler, a rather sophisticated process must be used to cure this latter type of patch, to wit, a tire mold or similar device. Thus when a patch is required, on the spot or in situ repair is exceedingly cumbersome at best and in most cases impossible, requiring the article to be returned to the shop.

The present invention utilizes a cured rubber patch secured to the elastomer substrate through an adhesive system which is curable at ambient temperatures. There is therefore no need for the use of a tire mold to effect repair and the article can easily and quickly be treated in the field, saving both time and expense. The adhesive system utilizes an amine curable polyurethane or other prepolymer and a treating agent.

Considering the prior art, U.S. Pat. Nos. 3,755,261 to VanGulick; 3,888,831 to Kogan; 3,834,934 to Broisman; 3,644,256 also to Broisman; and 3,718,587 to Bhakuni relate to amine curable curing agents, amine curable polymers, or R.F.L. type adhesives. However, these patents lack any suggestion of applicants' treating agent or repair of an elastomer article.

U.S. Pat. No. 3,779,794 to DeSantis relates to a moisture-curable polyurethane sealant primer system, whereas U.S. Pat. No. 4,085,283 to DenOtter relates to flame retardants utilized in cyanuric acid derivatives. Hughson Chemical Division, Lord Corporation, Product No. PS-2682-71 relates to a surface primer for elastomeric substances utilizing a proprietary compound thought to be mono- or dichloroisocyanuric acid. An article entitled "Room Temperature Vulcanizing Adhesive Based on Ethylene-Propylene-Diene Terpolymer," Cantor, Uniroyal, Paper No. 18, presented to the Division of Rubber Chemistry of the American Chemical Society, Denver, Colo., Oct. 10, 1973 relates to various oxidants which effect ambient temperature cures of E.P.D.M.

U.S. Pat. No. 4,136,219 to Oldam relates to a polyurethane paint which is applied to vulcanized rubbers. British Pat. No. 1,352,645 relates to a polyurethane paint which is applied to vulcanized rubbers.

U.S. Pat. No. 4,125,522 to Becker relates to a polyurethane adhesive, whereas U.S. Pat. No. 3,966,530 to Cutts relates to triazoline diones which are utilized in lieu of chlorinated or halogenated donors for treating elastomeric surfaces to improve adhesion.

U.S. Pat. No. 4,143,454 to Utsonomiya relates to a method of attaching connecting parts of an offshore structure wherein a liquid rubber is applied over a treating solution which may contain a halogen molecule. As such, this reference lacks applicant's treating agent as well as repair of an elastomeric article having a patch thereon.

U.S. Pat. No. 4,158,378 to Pearson relates to a cured rubber tire having a specific polyurethane therein and to a chlorine water treatment. Hence, Pearson also fails to teach or suggest applicant's recited treating agent as well as the patched article.

British Pat. No. 1,352,645 relates to N- halogen sulfonamide treating agents which halogenize surfaces of synthetic and/or natural rubbers.

U.S. Pat. No. 3,991,255 to Blaskjiewicz relates to the adhesion of a polyurethane to an EPDM surface utilizing various adhesives, however, Blaskjiewicz does not use his treating agent to form a treating layer and utilizes elevated temperatures.

U.S. Pat. No. 4,300,970 to Honda does not disclose amine curable resins or an ambient temperature cure.

U.S. Pat. No. 4,240,852 to Gomberg relates only to the use of a cyanoacrylate adhesive.

U.S. Pat. No. 4,352,704 to Williams relates to applying tire tread to a tire. This patent lacks any suggestion of applicant's treating agent or the repair of a tire aperture.

U.S. Pat. No. 4,327,138 to Hausch fails to disclose a cured rubber patch in repairing a rubber article.

One prior art method of repairing a tire article relates to the utilization of a proprietary compound thought to be a mixture of rubber and accelerators which is applied to the aperture and then cured. In general, a very poor adhesion results and heat is required.

DISCLOSURE OF THE INVENTION

It is therefore an aspect of the present invention to provide a repaired reinforced elastomer article having a hollow therein utilizing a cured rubber patch and an amine curable polymer or prepolymer.

It is another aspect of the present invention to provide a repaired reinforced elastomer article, as above, in which the hollow extends into or through the reinforced material and the repair is made at ambient temperatures.

It is a still further aspect of the present invention to provide a repaired elastomer article, as above, in which a layer of a treating agent is positioned on the inner surface of said article and on the cured rubber patch.

It is yet a further aspect of the present invention to provide a repaired reinforced elastomer article, as above, wherein said repaired elastomer article is a tire, a conveyor belt or the like.

It is still another aspect of the invention to provide a repaired elastomer article, as above, wherein said cured rubber patch is located juxtaposition to said hollow.

It is yet another aspect of the present invention to provide a repaired reinforced elastomer article, as above, wherein said patch has one or more cords therein.

It is still another aspect of the present invention to provide a repaired reinforced elastomer article, as above, wherein said amine curable polymer or prepolymer is a urethane polymer or prepolymer, and wherein said treating agent is trichloroisocyanuric acid (trichloro-s-triazinetrione).

These and other aspects of the present invention, which will become more apparent from the following description, are achieved by: a repaired elastomer article, comprising: the elastomer article, said article having a hollow therein; a cured gum rubber disposed within said hollow; a treating agent applied to the inner surface of said article immediately surrounding said filled aperture, said treating agent selected from the group consisting of: N-halohydantoins, N-haloamides, N-haloimides, and combinations thereof; an amine curable polymer or prepolymer applied over the treated surface of said article; and a patch positioned over said polymer or prepolymer; wherein said polymer of prepolymer is cured in situ at room temperature; and wherein said elastomer article is cured and unsaturated.

BEST MODE FOR CARRYING OUT THE INVENTION

The instant invention is useful in repairing reinforced elastomer articles wherein damage has been manifested as a chunk-out, leaving a hollow area in the article. The injury may extend completely through the article or only through a portion thereof, but reinforcement, that is cords, belts, or the like, contained in the article will have been partially or completely severed thereby providing a weakened area.

Figure 1:
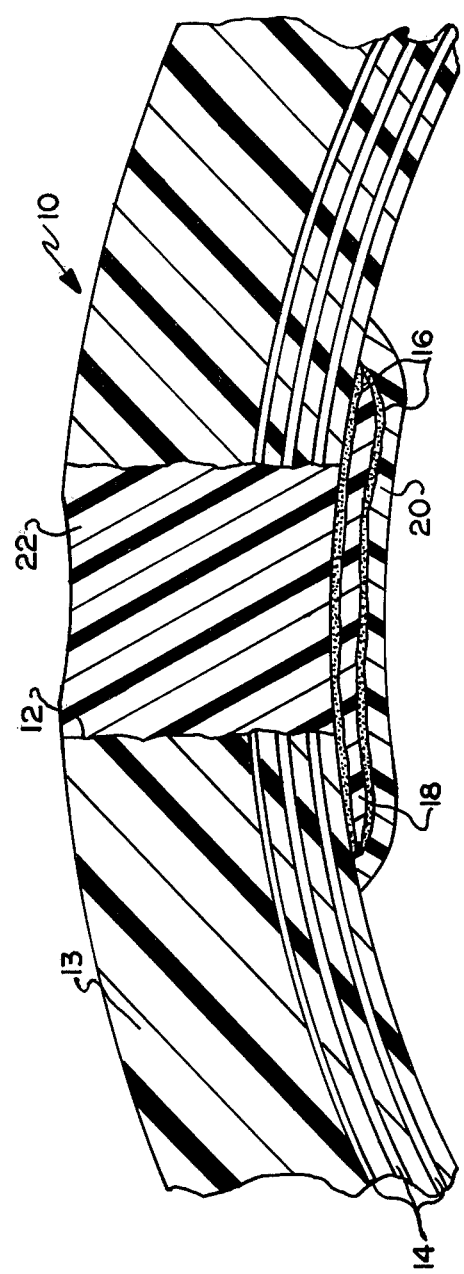
FIG. 1 relates to a cross-sectional view showing the repair of a reinforced elastomeric article having a hollow extending completely therethrough, according to the present invention.

The invention can be seen with reference to the figures. As is readily apparent, the salient features in each are identical except that the hollow low 120 in FIG. 2 does not extend completely through the substrate. For the sake of simplicity, all references to FIG. 1 shall have equal reference to FIG. 2, except for the dimensions of the hollow, as above. Referring then to FIG. 1, the article is generally indicated by the number 10, comprising a substrate 13 having embedded therein a plurality of reinforcement cords or belts 14. and a hollow 12.

The substrate 13 can be any conventional elastomer or rubber known to those skilled in the art and having unsaturated groups therein. For example, it can be made from conjugated dienes having from 4 to 12 carbon atoms such as butadiene, isoprene or the like. It can also be made from natural rubber, that is, from a substance which is obtained from various trees and plants which grow in the tropics or desert portions of the world. Such natural rubber generally has in excess of 90 and usually in excess of 95% of cis 1,4-polyisoprene content. The substrate may also be various elastomeric copolymers such as those made from monomers of conjugated dienes having from 4 to 12 carbon atoms as set forth above and vinyl substituted aromatic compounds having from 8 to 15 carbon atoms. Examples of such vinyl substituted aromatic compounds include styrene, alpha-methylstyrene, and the like. An example of a specific copolymer is styrene-butadiene rubber. Naturally, other types of rubber compounds can be utilized such as the so called butyl rubbers, neoprene, that is polychloroprene, and the like.

The preparation of such above noted various elastomers is well known to the art and the article in need of repair is often in the form of a tire, especially an off the road tire, a conveyor belt, or similar article. Regardless however of the type or nature of the article, it is desirable to clean the surface of the hollow prior to repair. Cleaning can take place as through a physical treatment of the area to be repaired, for example, as through buffing or skiving, that is, cutting or as removing a portion of the surface. Another method involves the use of any conventional organic solvent to remove dirt and residue. Typical solvents include acetone and ethyl acetate.

The next step in utilizing the invention is the packing of a quantity of uncured gum rubber 22 into the hollow 12, most preferably from the outer surface defined as that surface of the substrate opposite where a patch 20 is later positioned. The gum rubber is then cured in placed using conventional means such as a pair of heated plates, otherwise known as spotters, one applied to the outer surface 24 and one to the inner surface of the substrate.

The types of gum rubber which can be used are well known in the art, being generally composed of compounds of natural rubber or rubber blends and typically having other compounding ingredients such as sulfur, carbon black, accelerators, and the like. A variety of all purpose repair gums, readily available commercially, can be used. Alternatively, one skilled in the art can readily devise a suitable gum rubber recipe without undue experimentation.

Once the gum rubber has been cured in place, the innerside is buffed around the now filled aperture and a treating agent 16 applied both to the substrate and the cured gum rubber surfaces, which should of course be first cleaned as outlined above. An amine curable polymer 18 is then applied to the inner surface after having been first allowed to thicken or partially "set up", resulting in an increase in viscosity to several thousand centipoise. This results in a toothpaste-like consistency helping hold the polymer in place while the patch is applied.

The patch, after being buffed and having received a coating of treating agent 16, is then applied to the polymer surface. It is thereafter temporarily taped into place and held by some form of applied pressure, such as, in the case of a tire, a curing tube or a plurality of sand bags. The repair is allowed to set in this position for approximately 24 hours. The end result is a repaired article having much better strength and durability than one repaired according to heretofore known methods.

Figure 2:
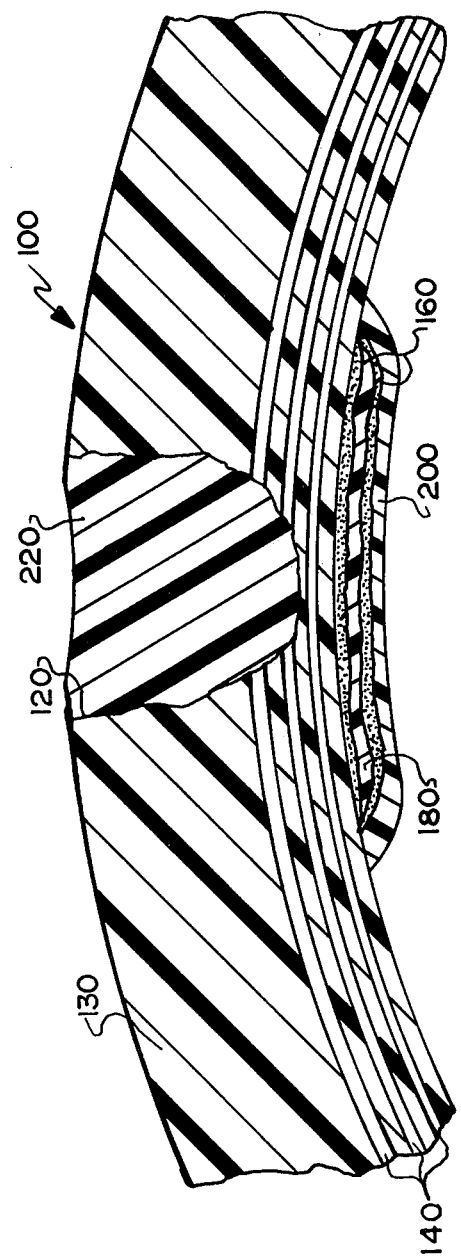
FIG. 2 is a cross-sectional view showing the repair of a similar reinforced elastomeric article wherein the hollow extends only partially therethrough.

In the embodiment of FIG. 2, the hollow 120 in the article 100 is in the form of a cavity wherein some cords 140 of the reinforced article have been damaged, severed, or the like. Usually at least 25 percent of the cords have been broken or damaged and the article is repaired utilizing a patch. Either the cavity can be filled or the patch applied first. In repair of cavity 120, the surface is first cleaned. The cavity is then filled with a gum rubber 220, generally to the level of the substrate 130. Naturally, in this operation, the cavity is located in the upper most vertical position of the article.

The area to be patched is prepared as before by cleaning and even buffing, in which, in either embodiment, the tie-gum layer or the cord ply layer can be exposed. Treating layer 160 is applied to the patch area of substrate 130 as well as to one side of the patch 200. The amine curable polymer or prepolymer 180 is then applied to the treated side of the patch, with the patch in turn being applied to the treated portion of substrate 130. The ends of the patch can be taped to the substrate or held in place with a curing tube located inside the tire. The number of cords in the patch is as previously set forth. That is, if less than 25 percent of the cords are damaged, the use of the patch having cords therein is optional in that a solid rubber patch provides adequate reinforcement. When approximately 25 to 50 percent of the cords are damaged, severed or the like, the strength of the cords in the patch is at least equal to the strength of such cords before being damaged. When approximately 50 percent or more of the cords are damaged, the strength of the cords and the patch is equal to the strength of the total number of cords in the substrate before any injury thereto. The repair is then cured at ambient temperature.

Suitable treating agents include the various N-halohydantoins, the various N-haloamides, the various N-haloimides and combinations thereof. Examples of various desirable N-halohydantoins include 1,3-dichloro-5,5-dimethyl halohydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichlorocyanuric acids. A preferred treating composition for use in the practice of the invention are the various mono-, di-, or trichloroisocyanuric acids or combinations thereof. Trichloro-s-triazinetrione (trichloroisocyanuric acid) is especially preferred.

The treating agents usually exist in solid form. They are readily soluble in solvents such as acetone and the like and thus can be applied in liquid form. Application of the treating agent generally occurs at ambient temperatures. Application can occur through any conventional manner as through brushing, spraying, or the like. The amount applied is such that the rubber substrate surface is coated. Preferably, two or more coats of the treating agent or adhesive compound are used to insure that all the cured rubber substrate surface has been coated.

A typical amount of the treating agent in the suitable solvent, for example ethyl acetate or acetone is generally from 0.1 to about 10% by weight based upon the total weight of said treating agent and solvent, and preferably from about 0.5% to about 5%. Of course higher or lower concentrations can be utilized. This solvent system has been found to dry within a matter of minutes so that the amine curable polymer or prepolymer can be bonded thereto. It is thought that the adhesive treating system adds halogen groups, for example, chlorine to the cured rubber which activates the cured rubber surface, allowing the amine curable polymer or polymer system to adhere strongly to the cured rubber surface.

Of the various amine curable polymers or prepolymers, the urethanes are preferred. Other prepolymers or polymers which can be cured with the amine curing agent include the compounds set forth in U.S. Pat. No. 3,755,261 which is hereby fully incorporated by reference. Briefly, such compounds includes the various epoxy resins such as those disclosed in the *Encyclopedia of Polymer Science and Technology*, Interscience Publishers, New York (1967), vol. 6, pages 212–221; halogen containing hydrocarbon polymers such as chloroprene polymers, chlorinated butyl rubber and chlorinated polyethylene and polypropylene; chlorosulfonated polymers such as those described in U.S. Pat. No. 2,723,257; polymers containing acid halide groups such as COCl and haloformate groups such as OCOCl; polymers containing anhydride groups which on reaction with diamines yield amide-acid linkages, and organopolysiloxanes as described in U.S. Pat. No. 2,938,010.

The urethane prepolymers or polymers, that is, those which contain isocyanate groups, are generally formed by first reacting a polyether polyol or a polyester polyol with a molar excess of a diisocyanate to form a prepolymer having terminal isocyanate groups. The polymer is then cured to increase its molecular weight from less than about 3000 upwards to over 10,000. Examples of such polymers are set forth in U.S. Pat. Nos. 2,618,516; 2,777,831; 2,843,568; 2,866,774; 2,900,368; 2,929,800; 2,948,691; 2,948,707; and 3,114,735 all of which are hereby fully incorporated by reference. Typical specific examples of such polyurethanes include Adiprene L-367 which is a polytetramethylene ether glycol containing approximately 6.4% isocyanate end groups by weight manufactured by DuPont; Adiprene L-42, a polytetramethylene ether glycol containing approximately 2.8% isocyanate end groups by weight, also manufactured by DuPont; and Cyanaprene A-7, a polyester-based coating polymer with approximately 2.4% isocyanate end groups, manufactured by American Cyanamid. Blends of these polyurethanes can also be utilized. Moreover, it has been found, particularly with repair or application of the amine curable polymer to the patch area, that is the area between patch 20 and cured substrate 13, better adhesion is often obtained by utilizing two different types of urethane. For example, a urethane containing a high amount by weight of isocyanate end groups, such as Adiprene L-367 can be blended with urethane containing a low amount by weight of isocyanate such as Adiprene L-42. The relative amount of one urethane to the other can range from about 1 to about 99% and desirably from about 30 to about 70% by weight.

To the amine curable prepolymer or polymer compound is added a conventional amine curing agent, known to those skilled in the art. Generally, any conventional or known amine curing agent can be used and therefore only a few specific examples will be given. Thus, the curing agent can be MOCA, that is, 4,4'-methylene bis (2-chloroaniline) or desirably, a complex of 4-4'-methylene dianiline and a salt, or a complex of racemic 2,3-di-(4-aminophenyl) butane and a salt as set forth in U.S. Pat. No. 3,755,261 to VanGulick which is hereby fully incorporated by reference. The methods for preparing the complexes are also set forth therein. A preferred salt utilized with the 4,4'-methylene dianiline compound is sodium chloride or lithium chloride. Due generally to availability and cost, the complexes or salts derived from 4,4'-methylene dianiline are highly preferred. Another class of amine curing agents which can be utilized are the various Versamides, that is, the condensation products of polyamines and dibasic acids obtained when certain unsaturated fatty acids are polymerized, and are manufactured by The Henkel Chemical Company.

The equivalent weight of the curing agent utilized with regard to the curable prepolymer or polymer, including the amine curing agent, generally ranges from about 85% to 115% with from about 95 to 105% being preferred. Often to facilitate processing, the curing agent and especially an amine curing agent, such as the complex of 4,4'-methylene dianiline and a salt is utilized with a plasticizer such as dioctylphthalate (DOP) on a 50% weight basis or tetraethylene glycol bis (2-ethylhexanoate) manufactured by Union Carbide Corporation on a 50% weight basis under the trade name Flexol 4GO. The amount of plasticizer can range from about 20% to about 60 weight percent.

The curing agent is blended with the prepolymer or polymers in various mixers such as dough mixers, high speed impellers, paddle-type mixers, and the like. Small batches can be mixed by stirring with a spatula. Usually the prepolymer or polymer is a liquid. If not, when mixed with the polar solvent, a liquid mixture results. However, even if a solid curing agent is used, when added to the prepolymer or the polymer, and to a solvent system, a liquid system results even though the curing agent (e.g., amine) can be in the form of a dispersion. Thus, although the system may contain solids therein, the solids exist in the form of a dispersion so that a liquid system is produced.

The curing agent and the amine curable polymers or prepolymers form the curable polymer system which is mixed with a polar solvent so that a liquid system is obtained which cures at ambient or room temperature, that is, the prevailing temperature is from about 10 degrees C. to about 50 degrees C. Often the ambient temperature will range from about 15 degrees C. to about 35 degrees C. or 40 degrees C. The polar solvents which can be utilized, especially with the amine curing agent and the amine polymers or prepolymers are, for example, set forth in U.S. Pat. No. 3,888,831 to Kogan which is hereby fully incorporated by reference. Such solvents include those having dipole moments in excess of 0.4 Debye in which there are no more than a total of 8 methyl, methylene or tertiary carbon radicals per polar group.

Generally, the amount of solvent utilized per 100 parts by weight of the curable prepolymer or polymer ranges from about 2 to about 40, desirably from about 2 to about 20 and preferably from about 5 to about 15 parts by weight. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred. The amount of curing agent based upon said polymer or prepolymer ranges from about 0.85 to about 1.15 equivalents.

Considering patch 20, it can generally be of any desired size so long as it is greater in surface area than the hollow it seals. Typically, the surface area of the patch is at least twice as great as the hollow. Generally, an appropriate patch size will be known to one skilled in the art of patch construction and/or patch application. The patch is made of rubber and is generally fully cured. Although cured natural rubber or a composition containing at least 80% by weight of natural rubber is often preferred, any conventional type of cured rubber compound can be utilized. Thus, the patch can be made from a conjugated diene having from 4 to 12 carbon atoms, copolymers made from conjugated dienes having from 4 to 12 carbon atoms with vinyl substituted aromatics having from 8 to 15 carbon atoms, for example styrene-butadiene rubber, and the like. In essence, the patch can be made from the same type of rubber as the substrate. Often, the patch will have a cushioned layer thereon to alleviate stresses formed between the tire carcass and the patch.

Because the patch must provide structural reinforcement to the repaired article, it generally utilizes cords in the same manner as the article. Although the number of cords can range from a small number to a very large number, as above, they generally equal in strength the cords damaged in the substrate. Such a provision provides an adequate reinforcement for the article. The cords can be made of polyester, nylon, steel, rayon, or the like with nylon being preferred. It has been found that according to the present invention, large hollows can be repaired up to approximately 8 inches in diameter.

In preparing the amine curable polymer system, generally the amine curable polymer or prepolymer is mixed with the polar solvent and thereafter the curing agent. During cure, an effective and strong bond is formed between the prepolymer or polymer system and the treated elastomer substrate. Since the present invention relates to an ambient temperature cure, repair of large and cumbersome articles such as off the road tires, conveyor belts, and the like can be made in situ. In other words, the repair can be made at the job site. The only accessory which may be required is some means for holding the patch in place while the polymer cures. As above, this can be an inflatable bladder or one or more sand bags. Since the cure is ambient, no steam chambers or other vulcanizing tire repair equipment is required other than that necessary to cure the gum rubber. This of course also results in an energy savings.

It is to be understood that various conventional additives in typical amounts can be added to the amine curing agent and prepolymer system such as colorants, softeners, fillers, antioxidants, plasticizers, and the like.

The invention will be better understood by reference to the following representative examples:

EXAMPLE 1

Sidewall Section Repair

An 11.00 R 24.5 steel radial truck tire containing two injuries in the sidewall was repaired as follows: injury number 1 was ⅝ inches wide by 4 inches long after buffing with a tungsten-carbide tip tool. The buffed area was cleaned with a rubber solvent. The innerliner was then marked with an outline of the patch and likewise buffed with the tungsten-carbide tool. Only the innerliner was buffed. The buffed areas were cleaned again with a rubber solvent and allowed to dry thoroughly. A coat of Firestone's Sup-R-Tac rubber cement was applied to the buffed areas. It also was allowed to dry thoroughly. An uncured patch was stitched into place (Rocson 5314-6, Rocson, Inc., Copley, Ohio). Uncured all-purpose gum rubber (Roscon regular cure AP repair gum) was then stitched into the external injury. The repair was cured in a Vulcan split-rim mold.

Injury number 2 was ⅝ inch wide by 3½ inches long after buffing with a tungsten-carbide tip tool. The cut was cleaned thoroughly with a rubber solvent and allowed to dry. A cover patch was cemented and stitched to the innerliner in order to hold the gum rubber in the external injury. The cover patch, made from the all purpose gum rubber, was about ½ inch larger in all directions than the injury and about ⅛ inch thick. One coat of Firestone's Sup-R-Tac rubber cement was applied to the injured area and allowed to dry. Uncured all-purpose gum rubber (Roscon regular cure AP repair gum) was stitched into the external injury and cured in a Vulcan split-rim mold. The reinforced patch was then installed as follows: the innerliner was buffed to the patch size, making sure to remove the cover strip added earlier. The patch was also buffed. The buffed areas, patch and innerliner, were cleaned with acetone on a piece of Rymplecloth and allowed to dry. Two coats of a 3 percent trichloro-s-triazinetrione in ethyle acetate were applied to the buffed innerliner and patch. After the primer system had dried, a standard 50/50 kit was mixed. The composition was as follows:

| Adiprene L 42 | 150 grm. | |
|---|---|---|
| Adiprene L 367 | 150 grm. | |
| Flexol 4GO | 30 grm. | A-side |
| Acetone | 30 grm. | |
| Caytur 21 | 72 grm. | |
| | | B-side |
| Black MB* | 2 grm. | |

*15 parts of carbon black in Dioctyl phthalate base.

The thoroughly mixed material was allowed to thicken to a nearly non-pourable stage and then applied to the patch and innerliner area. The patch was placed in position and held there with tape. A tube was then inserted and inflated to hold the patch in position and to apply pressure on it. The patch was cured for 24 hours at room temperature. After the 24 hour cure period, the tape and tube were removed. The repair had good appearance. The tire was tested on a radial truck tire endurance test known as a C-2 test, which loads the tire 40 percent over the rated load and runs 22 mph until failure. The tire failed at 4455 miles yielding very good performance for a repaired tire. As a comparison, new tires are expected to run 7000 miles and a used tire over 3000 miles. The failure occurred on the opposite side of the tire, away from the two repairs. The uncured patch had fallen off of the innerliner.

Example 2

Full Section (Crown) Repair

An 18.00×25,28 ply rated, off-the-road (OTR) tire containing a 1×2½ inch injury completely through the tire in the crown area was repaired as follows: the injury was buffed clean to an RMA #3 or #4 buff rating using a tungsten carbide tool. The innerliner was lightly buffed ½ to 1 inches wider than the injury. The buffed areas were cleaned with a rubber solvent and allowed to dry. A coat of Firestone's Sup-R-Tac rubber cement was applied to the buffed surface and allowed to dry. A cover patch made from uncured all purpose gum rubber (⅛ inch thick Crocson Patch Company, Copley, Ohio) was stitched onto the innerliner. The external injury was then filled with the same rubber by stitching small amounts in at a time. The spot was then cured using a Vulcan mold. After the tire had cooled, the patch was positioned over the internal injury and outlined. The temporary cover patch, innerliner, tie-gum and two body plys were removed from the tire, tapering the edges of the innerliner so that the patch made a close fit with it. The patch, a Roco No. 4, was also buffed. All buffed areas were cleaned using acetone and Rymplecloth. After the surfaces had dried, several coats of a 3 percent trichloro-s-triazinetrione in ethylacetate were applied to the innerliner area and the patch. The primer was allowed to dry thoroughly. A standard 50/50 kit described in example 1 was mixed thoroughly and allowed to thicken nearly to a non-pourable stage. The material was then applied to the patch and innerliner areas. The patch was installed and taped in place. A tube was inflated behind the patch to hold the patch in position and to apply pressure to it. The patch was cured 24 hours at room temperature after which the tube and tape were removed. The repair looked excellent. The tire was recapped and sent back into service. The tire has not been returned after seven months, indicating that no failure has occurred.

Example 3

Reinforce (Crown) Repair

A 33.5×33,44 ply rated, OTR tire requiring a reinforce patch was repaired as follows: the weakened area of the tire was located on the inside of the tire and marked. A template of the size of the patch to be added was centered over the injured area and outlined. The area was buffed with a tungsten carbide tool down to the top or first body ply (removed innerliner and tie-gum layers). The buffed area was washed thoroughly with acetone on a piece of Rymplecloth. Both the patch and innerliner were then treated with several coats of a 3 percent trichloro-s-triazinetrione in ethyl acetate. The primer was allowed to dry thoroughly. A standard 50/50 kit described in example 1 was mixed thoroughly and allowed to thicken nearly to a non-pourable stage. The material was then applied to the patch and innerliner areas. The patch was installed and taped in place. A tube was inflated behind the patch to hold the patch in position and to apply pressure to it. The patch was cured 24 hours at room temperature. After the 24 hours had elapsed, the tube and tape were removed. The repair looked very good and was tightly bound to the innerliner. The tire was recapped, the external spot being repaired at the time of recapping. The tire was sent back into service. The tire has not been returned after seven months, indicating continued use.

Generally, any rubber article having a hollow therein can usually be repaired by the present invention. Specific examples include conveyor belts and tires, especially off the road tires such as those utilized for front-end loaders, mining equipment machines and the like.

While various preferred embodiments of the present invention, as well as the best mode thereof have been described in detail, in accordance with the Patent Statutes, it is to be understood that the invention is measured by the attached claims.

What is claimed is:

1. A repaired elastomer article, comprising:
   the elastomer article, said article having a hollow therein;
   a cured gum rubber disposed within the said hollow and filling it thereby;
   a treating agent applied to the inner surface of said article immediately surrounding said filled hollow, said treating agent selected from the group consisting of: N-halohydantoins, N-haloamides, N-haloimides, and combinations thereof;
   an amine curable polymer or prepolymer applied over the treated surface of said article; and an elastomeric patch positioned over said polymer or prepolymer;

wherein said polymer of prepolymer is cured in situ at room temperature wherein said patch has a coating of the treating agent on its inner surface; and wherein said elastomer article is cured and unsaturated.

2. A repaired elastomer article according to claim 1, wherein said article has cords therein, and wherein said patch has cords therein.

3. A repaired elastomer article according to claim 2, wherein said amine curable polymer or prepolymer is selected from the group consisting of epoxy resins, halogen-containing hydrocarbon polymers, chlorosulfonated polymers, polymers containing acid halide groups, or haloformate groups, polymers containing anhydride groups which, on reaction with diamines, yield amide acid linkages, organopolysiloxanes, urethane polymers or prepolymers and combinations thereof; and wherein said treating agent is selected from the group consisting of 1,3-dichloro-5,5-dimethylhydantoin, 1,3-dichloro-5-methyl-5-isobutyl hydantoin, 1,3-dichloro-5-hexylhydantoin, N-bromoacetamide, tetrachloroglycoluril, N-bromosuccinimide, and mono, di, or trichloroisocyanuric acid.

4. A repaired elastomer article according to claim 3, wherein said ambient temperature cure of said amine curable polymer or prepolymer occurs at a temperature of from about 10 degrees C. to about 50 degrees C.

5. A repaired elastomer article according to claim 4, wherein said treating agent is selected from the group consisting of monochloroisocyanuric acid, dichloroisocyanuric acid, trichloroisocyanuric acid and combinations thereof.

6. A repaired elastomer article according to claim 5, wherein said amine cured polymer or prepolymer is said urethane polymer or prepolymer.

7. A repaired elastomer article according to claim 5, wherein said patch contains at least 70 % by weight of natural rubber.

8. A repaired elastomer article according to claim 7, wherein the strength of cords in said patch is approximately equal to the strength of cords in said elastomer article.

9. A repaired elastomer article according to claim 7, wherein said elastomer article is a tire.

10. A process for repairing an elastomer article having a hollow therein, comprising:

filling the hollow with a gum rubber;

curing said gum rubber;

applying a treating agent to the inner surface of the article immediately surrounding the filled hollow;

applying a quantity of amine curable polymer or prepolymer over the treated surface of said article;

applying a treating agent to the surface of an elastomeric patch and positioning said patch over said polymer or prepolymer; and curing said polymer or prepolymer at room temperature;

wherein said treating agent is selected from the group consisting of: N-halohydantoins, N-haloamines, N-haloimides, and combinations thereof.

11. A process according to claim 10, wherein said article has previously been cured, and wherein said patch has previously been cured.

12. A process according to claim 11, wherein said article has cords therein and wherein said patch has cords therein.

13. A process according to claim 12, wherein said amine curable polymer or prepolymer system comprises a polar solvent, amine curable polymer or prepolymer and an amine curing agent, said polar solvent having a dipole moment in excess of 0.4 Debye in which there are no more than a total of 8 methyl, methylene or tertiary carbon radicals per polar group contained in said compound, and benzene and biphenyl; and said amine curable polymer or prepolymer is selected from the group consisting of: epoxy resins, halogen containing hydocarbon polymers, chlorosulfonated polymers, polymers containing acid halide groups and haloformate groups, polymers containing anhydride groups which, upon reaction with said diamines, yield amide acid linkages, organo polysiloxanes, and urethane polymers or prepolymers.

14. A process according to claim 13, wherein said treating agent is selected from the group consisting of 1,3-dichloro-5,5-dimethyl-hydantion, 1,3-dichloro-5-isobutyhydantoin, 1,3-dichloro-5-methyl-5-hexylhydantoin, N-bromoacetamide, tetrachloroglyclouril, N-bromosuccinimide, and mono, di, or trichloroisocyanuric acid, and wherein said ambient temperature cure is at a temperature of from about 10 degrees to about 50 degrees C.

15. A process according to claim 14, wherein said treating agent is selected from the group consisting of monochloroisocyanuric acid, dichloroisocyanuric acid, trichloroisocyanuric acid, and combinations thereof, and wherein said polar compound ranges from about 2 to about 40 parts per 100 parts of said prepolymer or polymer and is selected from the group consisting esters, ketones, ethers, halogenated hydrocarbons, tertiary amines, nitrile paraffins, fully substituted amides, sulfones, sulfoxides and sulfides.

16. A process according to claim 15, wherein said amine curable polymer or prepolymer is said urethane polymer or prepolymer, and wherein said patch contains at least 70% by weight of natural rubber.

17. A process according to claim 16, wherein said polar solvent is selected from the group consisting of dimethylformamide, tetrahydrofuran, cyclohexanone, ethyl acetate, methyl ethyl ketone, and acetone, and wherein said amine curing agent is selected from the group consisting of (a) 4,4'-methylene bis (2-chloraniline), (b) a complex of 4,4'-methylene dianiline and a salt, said salt being selected from the group consisting of sodium chloride, sodium bromide, sodium iodide, sodium nitrite, lithium chloride, lithium bromide, lithium iodide, lithium nitrite, and sodium cyanide, (c) a complex of racemic 2,3-di-4 (aminophenyl) butane with a salt, said salt selected from the group consisting of sodium chloride, sodium bromide, sodium iodide, potassium chloride, potassium bromide, potassium iodide, cesium chloride, cesium bromide, and cesium iodide, the ratio of said dianiline or said butane to said salt in said complex being 3 moles to 1 mole, the equivalent amount of said curing agent based upon said prepolymer or polymer ranging from about 0.85 to about 105.

18. A process according to claim 16, wherein said elastomer article is a tire.

19. A process according to claim 17, wherein said elastomer article is a tire.

* * * * *